United States Patent
Kulaga et al.

(10) Patent No.: US 12,131,141 B2
(45) Date of Patent: Oct. 29, 2024

(54) SYSTEMS AND METHODS FOR SEAMLESS SOFTWARE MIGRATION

(71) Applicant: Acronis International GmbH, Schaffhausen (CH)

(72) Inventors: Andrey Kulaga, Moscow (RU); Serguei Beloussov, Costa del Sol (SG); Stanislav Protasov, Singapore (SG); Nikolay Grebennikov, Sofia (BG)

(73) Assignee: Acronis International GmbH, Schaffhausen (CH)

( * ) Notice: Subject to any disclaimer, the term of this patent is extended or adjusted under 35 U.S.C. 154(b) by 0 days.

(21) Appl. No.: 17/323,075

(22) Filed: May 18, 2021

(65) Prior Publication Data

US 2021/0382705 A1 Dec. 9, 2021

Related U.S. Application Data

(60) Provisional application No. 63/035,932, filed on Jun. 8, 2020.

(51) Int. Cl.
*G06F 8/61* (2018.01)
*G06F 9/48* (2006.01)

(52) U.S. Cl.
CPC .............. *G06F 8/62* (2013.01); *G06F 9/4881* (2013.01)

(58) Field of Classification Search
CPC .................................. G06F 8/62; G06F 9/4881
See application file for complete search history.

(56) References Cited

U.S. PATENT DOCUMENTS

| | | | |
|---|---|---|---|
| 6,035,423 A * | 3/2000 | Hodges | G06F 8/65 709/219 |
| 8,424,088 B1 * | 4/2013 | Kowalyshyn | H04L 63/1441 717/174 |
| 9,864,597 B1 | 1/2018 | Marmaros et al. | |
| 9,928,056 B1 * | 3/2018 | Chittigala | H05K 999/99 |
| 10,331,483 B1 * | 6/2019 | Warman | G06F 9/5038 |
| 2005/0091651 A1 | 4/2005 | Curtis et al. | |
| 2005/0166199 A1 * | 7/2005 | Willis, II | G06F 8/65 717/173 |
| 2005/0262500 A1 * | 11/2005 | Stanley | G06F 8/65 717/173 |

(Continued)

*Primary Examiner* — Wei Y Zhen
*Assistant Examiner* — Brahim Bourzik
(74) *Attorney, Agent, or Firm* — ArentFox Schiff LLP; Michael Fainberg

(57) ABSTRACT

Disclosed herein are systems and method for seamlessly migrating from an existing software to a new software. In one exemplary aspect, a method may comprise retrieving usage activity information of the existing software from the at least one computing device and identifying settings from the existing software to migrate. The method may further comprise converting, based on an internal database with metadata information about the new software, the settings in the existing software to corresponding settings in the new software, and determining, based on the usage activity information, a migration plan indicative of a sequence of tasks for installing the new software and removing the existing software such that a quality of service associated with accessing the plurality of features on the at least one computing device does not decrease to less than a threshold quality of service. The method may further comprise executing the migration plan.

16 Claims, 6 Drawing Sheets

(56) References Cited

U.S. PATENT DOCUMENTS

| | | | |
|---|---|---|---|
| 2006/0080656 A1* | 4/2006 | Cain | G06F 8/65 717/174 |
| 2006/0174344 A1* | 8/2006 | Costea | G06F 21/564 726/24 |
| 2007/0294695 A1* | 12/2007 | Jensen | G06F 9/4843 718/102 |
| 2008/0148268 A1 | 6/2008 | Hirouchi | |
| 2009/0037824 A1* | 2/2009 | Vedula | G06F 11/302 715/736 |
| 2011/0126187 A1* | 5/2011 | Alberti | G06F 8/65 717/172 |
| 2014/0026129 A1 | 1/2014 | Powell et al. | |
| 2015/0178062 A1* | 6/2015 | Adderly | G06F 8/65 717/170 |
| 2016/0011863 A1* | 1/2016 | Isaacson | G06F 8/654 717/173 |
| 2016/0255115 A1* | 9/2016 | Mital | H04L 63/20 726/1 |
| 2020/0241866 A1* | 7/2020 | Gupta | G06F 8/65 |

* cited by examiner

SYSTEMS AND METHODS FOR SEAMLESS SOFTWARE MIGRATION

CROSS-REFERENCE TO RELATED APPLICATIONS

This application claims the benefit of U.S. Provisional Application No. 63/035,932, filed Jun. 8, 2020, which is herein incorporated by reference.

FIELD OF TECHNOLOGY

The present disclosure relates to the field of software migration, and, more specifically, to systems and methods for seamlessly migrating from an existing software to a new software.

BACKGROUND

Managed service providers (MSPs) are businesses that offer multiple, managed, information technology (IT) services to other businesses. MSPs today largely deliver their services remotely over a network. One of the challenges that MSPs come across is switching between software provided by different vendors. For example, an MSP may use an anti-virus software provided by a first vendor. If a different anti-virus software is introduced into the market by a second vendor, and the different anti-virus software works more efficiently or is cheaper than the anti-virus software being currently used, the MSP may be interested in making a switch. However, this requires a long migration involving customization for the needs of a client, customization for the hardware running the software, and customization to retain features of stored and processed data. Because migration is labor-intensive, unreliable, adds to the total cost of ownership (TCO) of the new software, and causes a decrease in the quality of service (during the change), MSPs are often unwilling to upgrade their infrastructure.

SUMMARY

In order to streamline the upgrading process, aspects of the disclosure describe methods and systems for seamlessly migrating from an existing software to a new software.

In one exemplary aspect, a method may comprise receiving a command to migrate from the existing software to the new software on at least one computing device, wherein the existing software and the new software share a plurality of features. Responsive to receiving the command, the method may comprise retrieving usage activity information of the existing software from the at least one computing device and identifying settings from the existing software to migrate. The method may further comprise converting, based on an internal database with metadata information about the new software, the settings in the existing software to corresponding settings in the new software. The method may further comprise determining, based on the usage activity information, a migration plan indicative of a sequence of tasks for installing the new software and removing the existing software such that a quality of service associated with accessing the plurality of features on the at least one computing device does not decrease to less than a threshold quality of service. The method may further comprise executing the sequence of tasks by installing the new software, implementing the corresponding settings, and removing the existing software.

In some aspects, the method may comprise presenting the migration plan to an administrator of the at least one computing device, wherein executing the sequence of tasks is in response to receiving an approval of the migration plan from the administrator.

In some aspects, the existing software and the new software are anti-virus software, and identifying the settings from the existing software to migrate further comprises identifying at least one of: (1) an anti-virus scanning schedule, (2) actions to perform for each type of virus and malware, (3) exception directories that do not need to be scanned, (4) authorized users.

In some aspects, executing the sequence of tasks comprises identifying a feature of the existing software, wherein the feature is in the plurality of features, installing files of the new software associated with the feature, applying a setting of the corresponding settings to the installed files, such that the feature is accessible on the new software, forwarding requests to access the feature received at the at least one computing device to the new software, and removing files of the existing software associated with the feature.

In some aspects, determining the migration plan further comprises ranking each respective feature in the plurality of features based on a likelihood of the respective feature being accessed during migration, and scheduling tasks of the sequence of tasks in accordance with the ranking, wherein features with higher likelihoods are scheduled for installation before features with lower likelihoods.

In some aspects, determining the migration plan further comprises ranking each respective feature in the plurality of features based on a likelihood of the respective feature being accessed during migration, and scheduling tasks of the sequence of tasks in accordance with the ranking, wherein features with lower likelihoods are scheduled for installation before features with higher likelihoods.

In some aspects, identifying the settings of the existing software further comprises identifying at least one setting manually adjusted by a user of the existing software of the at least one computing device.

In some aspects, identifying the settings of the existing software further comprises identifying at least one setting for migration in response to determining that the at least one setting has been unchanged by a user of the existing software for more than a threshold period of time.

In some aspects, identifying the settings of the existing software further comprises not selecting at least one setting for migration in response to determining that the at least one setting does not optimize the quality of service when accessing at least one feature of the plurality of features on the new software.

In some aspects, the existing software and the new software are anti-virus software, and the quality of service is measured based on any combination of: (1) a time required to perform a scan of the at least one computing device, (2) an amount of objects scanned on the at least one computing device, (3) a number of malicious objects found, (4) an amount of directories that are infected despite an active firewall, and (5) an amount of time to download new virus definitions.

It should be noted that the methods described above may be implemented in a system comprising a hardware processor. Alternatively, the methods may be implemented using computer executable instructions of a non-transitory computer readable medium.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for seamlessly migrating from an existing software to a new software. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
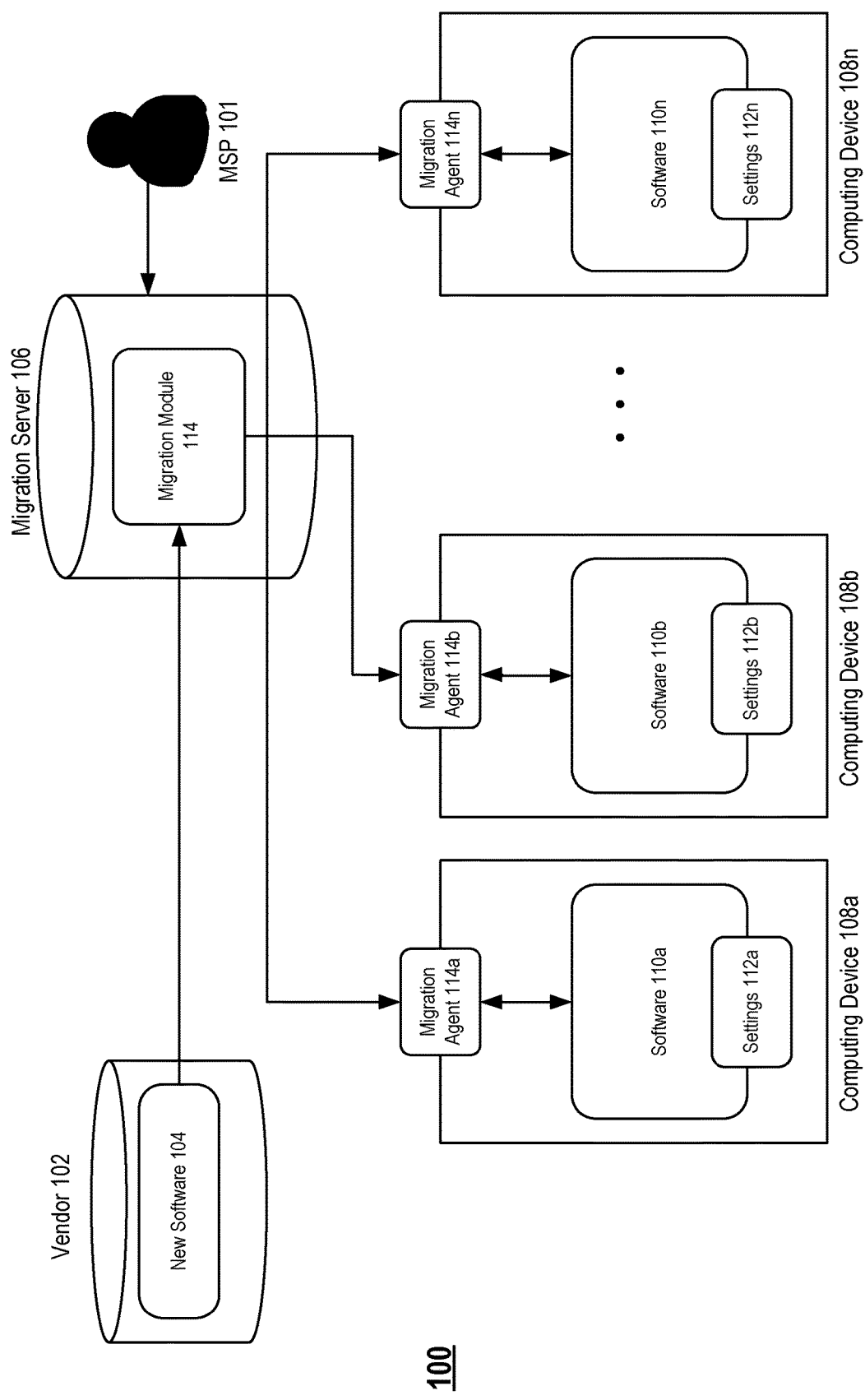
FIG. 1 is a block diagram illustrating a system for seamlessly migrating from an existing software to a new software, in accordance with aspects of the present disclosure.

FIG. 1 is a block diagram illustrating system 100 for seamlessly migrating from an existing software to a new software, in accordance with aspects of the present disclosure. In system 100, MSP 101 represents a service provider for a plurality of computing devices (e.g., 108a, 108b, 108n, etc.). In the present disclosure, information exchanged between migration server 106 and MSP 101 may be understood as information exchanged between server 106 and a device used by a member of MSP 101 (e.g., an administrator).

Migration server 106 comprises migration module 114 that is configured to orchestrate a seamless migration of software over the plurality of computing devices. Each computing device 108 comprises migration agent 114, which may be a client application that communicates with migration module 114 on migration server 106. In some aspects, migration agent 114 is a thin client and migration module 114 is a thick client. Communication between MSP 101, migration server 106, and the plurality of computing devices 108 may be conducted over the same network. The network may be a local area network (LAN) or a wide area network (WAN) such as the Internet. In some aspects, each of the computing devices are independent and are not associated with MSP 101. Accordingly, the software to be installed on a particular computing device (e.g., 108a) is unrelated to MSP 101 or any of the other depicted computing devices (e.g., 108b, 108n, etc.)

In an exemplary aspect, migration module 114 may receive a command to migrate from an existing software to new software on at least one computing device. In some aspects, the command may originate from MSP 101, while in other aspects, the command may originate from one of the computing devices 108. It should be noted that each device is labelled in FIG. 1 with a number, followed by a character (e.g., 'a,' 'b,' 'n', etc.). Only one character is shown for simplicity. The characters are used to identify and group components of a particular computing device. For example, all labels ending in 'a' such as migration agent 114a, settings 112a, software 110a, etc., represent components and software on computing device 108a. In some aspects, the command received by migration module 114 may further indicate which computing devices to update with new software 104. For example, MSP 101 may only want a select few computing devices to be updated with new software 104.

In some aspects, in response to receiving the command, migration module 114 may determine whether new software 104 can be installed on an identified computing device. For example, some computing devices may be incompatible with new software 104 due to outdated operating systems and/or hardware. In response to determining that an identified computing device is incompatible with new software 104, migration module 114 may transmit an error message reporting the incompatibility issue to MSP 101.

Software 110 and new software 104 may be similar computer programs that share a plurality of features. For example, software 110 may be an anti-virus program and new software 104 may be a different anti-virus program. Features such as periodic scanning, virus definitions, and removal/quarantine methods may be shared amongst many other features. MSP 101 or any of the computing devices may choose to replace software 110 with new software 104. The present disclosure describes systems and methods for replacing software 110 with new software 104 while retaining as many desired settings 112 from software 110 as possible and ensuring that the quality of service (QoS) does not decrease during the replacement. This specific software replacement/updating is referred to as seamless migration.

Each of software 110 is configured with settings 112 that are identified for migration (i.e., applying to new software 104). It should be noted that because software 110a is used differently than software 110b (e.g., because the respective computing devices may have different users or different types of devices), different settings are applied to new software 104 depending on which device new software 104 is applied.

Responsive to receiving the command, migration module 114 retrieves usage activity information of software 110 from computing device 108 and identifies settings 112 from software 110 to migrate. This is further discussed in FIGS. 2 and 3.

Figure 2:
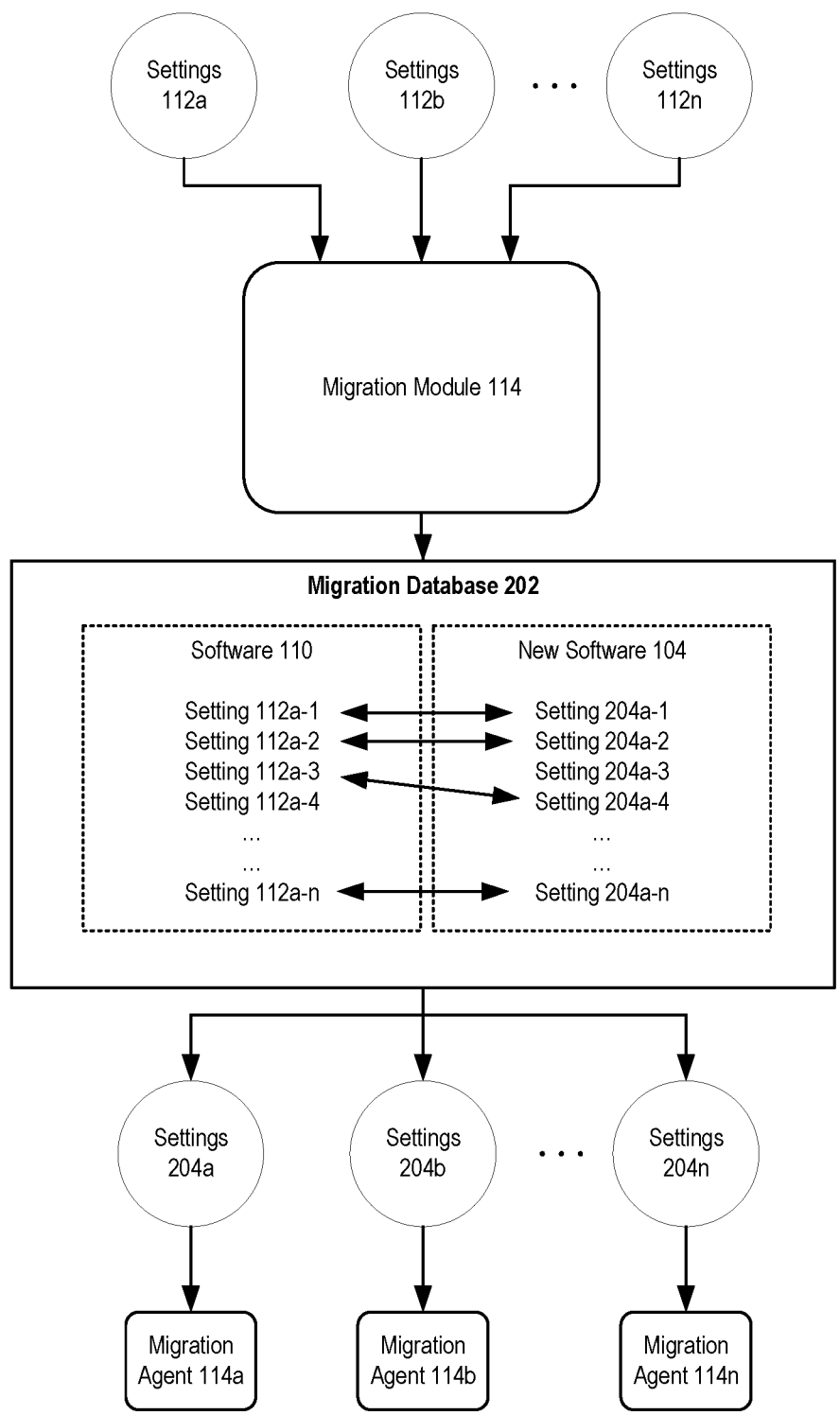
FIG. 2 is a block diagram illustrating a system for extracting and converting settings from an existing software to a new software, in accordance with aspects of the present disclosure.

FIG. 2 is a block diagram illustrating system 200 for extracting and converting settings from an existing software to a new software, in accordance with aspects of the present disclosure. In the example in which software 110 and new software 104 are both anti-virus applications, the settings to migrate from the existing software to the new software may include, but are not limited to, (1) an anti-virus scanning schedule, (2) actions to perform for each type of virus and malware, (3) exception directories that do not need to be scanned, and (4) authorized users. As shown in FIG. 2, settings 112 are extracted by the migration agents on each computing device and provided to migration module 114. For simplicity, the following example focuses solely on settings 112*a*, which originates from computing device 108*a*. Settings 112*a* are identified by migration agent 114*a* as the settings that are to be imported (if possible). Settings 112*a* comprises a plurality of individual settings/configurations as listed in FIG. 2 (e.g., setting 112*a*-1, 112*a*-2, 112*a*-3, etc.).

Because not all settings of software 110 may be compatible with new software 104 and not all settings in software 110 are particularly desired by the user, migration module 114 filters out settings that should be imported. For example, migration module 114 may analyze the command/configuration logs of software 110*a* to identify at least one setting manually adjusted by a user of the existing software 110*a* of computing device 108*a*. If a user makes a manual selection of a setting, there is a greater likelihood that the user will want to see this setting in the new software 104. For example, if the user switched the periodicity of anti-virus scans from daily to weekly, it is possible that the user does not want frequent scans. This provides migration module 114 with two pieces of information: what the user prefers and what the user does not prefer. In this case, when installing new software 104, migration module 114 will not set the periodicity to "daily" for new software 104. Likewise, because the user manually selected the weekly option, migration module 114 will set the scan periodicity to "weekly" based on the previous user selection.

In some aspects, migration module 114 may identify at least one setting for migration in response to determining that the at least one setting of software 110 has been changed within a threshold period of time (e.g., within the last month). Another indication that a user prefers a particular setting is if the setting has been recently changed. This change does not necessarily have to be directly from the user. However, because the change was performed recently, it is likely that the change is a part of an update that improves performance.

In some aspects, migration module 114 may identify at least one setting for migration in response to determining that the at least one setting has been unchanged by a user of the existing software for more than a threshold period of time (e.g., one year). For example, if a setting has been changed by a user and has then remained unchanged for a long period of time, there is a chance that the user has grown accustomed to it and prefers its outcome (e.g., changing when a scan can start to a preferred timing and keeping that change for a long period of time because it turns out to be convenient for the user).

Subsequent to identifying the settings to migrate from software 110*a* to new software 104, migration module 114 may begin converting the identified settings to corresponding settings in new software 104. Migration module 114 may rely on an internal data with metadata information about new software 104 and software 110*a*. FIG. 2 depicts, for example, migration database 202. Migration database 202 comprises a list of settings and possible configurations for each software. Migration database 202 may include additional information, for each software, such as product ID, vendor name, product name, language type, product regex, vendor regex, etc. The entries comprising settings may be pre-mapped such that migration module 114 may quickly search for matching settings over two or more software applications.

For example, setting 112*a*-1 of setting 112*a* may indicate a time period when anti-virus scans can take place. Migration module 114 may thus identify a similar time period setting in setting 204*a*-1. Accordingly, migration module 114 can match settings between software 110 and new software 104 for each computing device. Migration module 114 then generates settings 204, which are comprised of a list of settings that matched with the settings of software 110 identified for migration. Migration module 114 transmits each setting 204 to migration agent 114 of the respective computing device.

Figure 3:
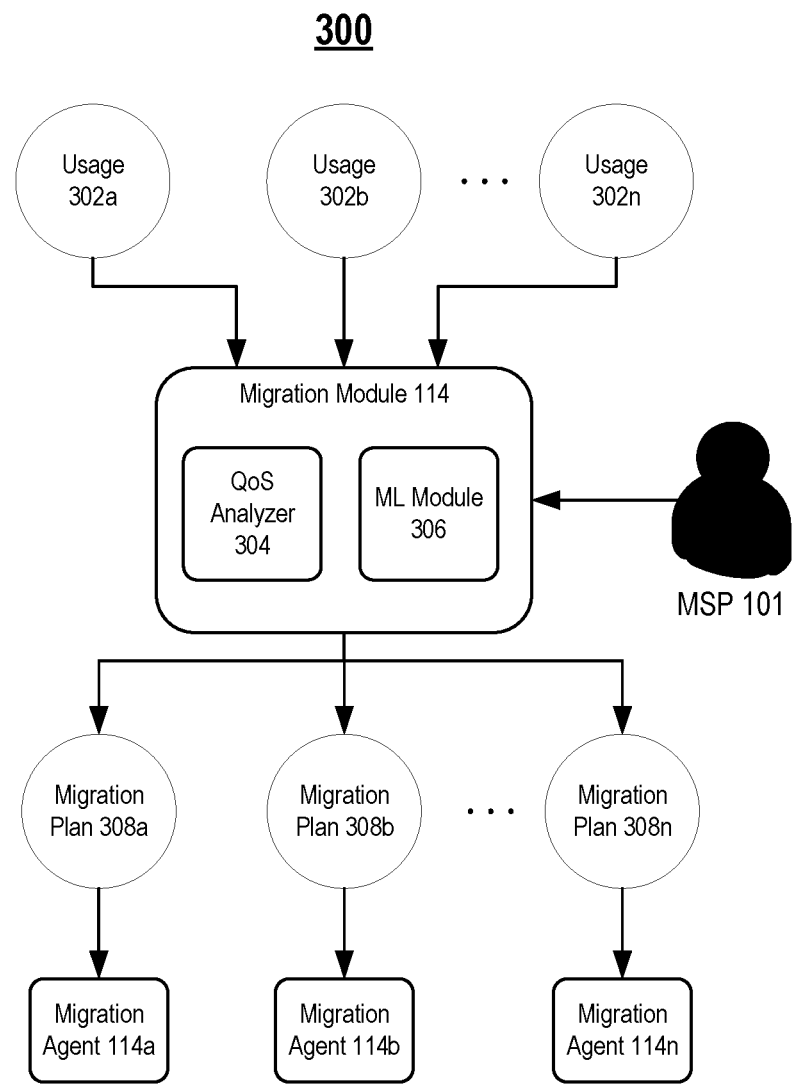
FIG. 3 is a block diagram illustrating a system for generating a migration plan, in accordance with aspects of the present disclosure.

FIG. 3 is a block diagram illustrating system 300 for generating a migration plan, in accordance with aspects of the present disclosure. Migration module 114 may receive usage activity information from each computing device. This information may include a log of actions taken on software 110. The log may include, for example, "started manual scan of [DATE, TIME]," "abandoned scan at [DATE, TIME]," "automatically scanned new directory [NAME] at [DATE, TIME]," etc. Based on usage 302, migration module 114 determines a migration plan indicative of a sequence of tasks for installing new software 104 and removing the existing software 110 such that a QoS associated with accessing the plurality of features on the at least one computing device does not decrease to less than a threshold QoS.

In some aspects, to create the migration plan, migration module 114 may rank each respective feature in the plurality of features shared between the two software based on a likelihood of the respective feature being accessed during migration. Migration module 114 may then schedule tasks of the sequence of tasks in accordance with the ranking. In some aspects, features with higher likelihoods are scheduled for installation before features with lower likelihoods. In other aspects, features with lower likelihoods are scheduled for installation before features with higher likelihoods.

In some aspects, migration module 114 may comprise QoS analyzer 304 and machine learning module 306. QoS analyzer 304 may be used to assign QoS values to various times, as indicated in the usage activity information, that a particular feature has been accessed. QoS can be measured in different ways including based on the time it takes to complete an action in the software. For example, if the software is an anti-virus software, QoS may be based on the time it takes to complete an anti-virus scan. A user may have begun an anti-virus scan at time t1 and the scan may have been completed in one hour. However, if the user did another scan of the same directories at t2 and the scan finished in five hours, the QoS of the latter scan is lower than the QoS of the former scan. The same applies if the software is, for example, a streaming application and a song download that normally takes 10 seconds instead takes 1 minute. For an anti-virus software, in some cases, QoS may be measured based on the number of malicious objects found, based on the amount of directories that are infected under the watch of an active firewall, based on the amount of time to download new virus definitions, etc. In general, for any type of software, QoS factors are dependent on the usage of the CPU, the network access speed, how prone the user is or makes himself/herself to malicious attacks (i.e., security/bugs), the software/hardware capabilities of a particular computing device, frequency of software crashes, frequency of hardware failures, etc.

In particular, migration module 114 attempts to avoid a degradation of QoS while the migration is occurring. Using ML module 306, migration module 114 may identify a time to perform the migration. ML module 306 may receive the usage activity information of the user and the QoS values generated by QoS analyzer 304 to predict when the user activity will minimize such that a migration can be performed. For example, ML module 306 may determine that the user activity will reduce between 8:00 pm and 10:00 pm (e.g., CPU consumption on a computing device of the user will be less than 30% when on average it is 50%). It is possible that the user runs a scan of only a select number of directories during this time. If QoS is measured based on time to perform a scan, historically the completion time of the scan may be 2 hours. By installing new software 104, the CPU usage may increase and slow down the scan to 2.5 hours. This represents a 25% reduction in QoS (i.e., the new QoS value is 75%). Migration module 114 may compare this value to a threshold QoS such as 60%, and in response to determining that the QoS value will be greater than the threshold QoS, migration module 114 may schedule the migration during that time.

As shown in the above example, the threshold QoS represents a value, such as a percentage, that relates to the QoS value. If the QoS value is measured in scan time, the threshold QoS value will also be a time value representing a maximum scan time. If the QoS value is measured in the number of objects scanned within a time period, the threshold QoS represents a minimum number of objects to scan within that time period.

Migration module 114 thus generates a unique migration plan 308 for each computing device (depending on the settings to be imported and usage activity information). For example, migration module 114 may transmit migration plan 308a to migration agent 114a and migration plan 308b to migration agent 114b.

It should be noted that when selecting settings to import to new software 104, migration module 114 may not select at least one setting for migration in response to determining that the at least one setting does not optimize the QoS when accessing at least one feature of the plurality of features on the new software (based on developer recommendations and/or MSP instructions). For example, certain settings in new software 104 may naturally yield better application performance (e.g., faster scan times and updates). Because of this, there is no need to import the old settings. These settings can be based on new features not found in the existing software. For example, a new anti-virus software may use a different approach to scanning the computing device that enables faster scans and requires more frequent scans. Thus, if the user originally set the scan frequency to bi-weekly in the existing software, and a vendor/developer recommends weekly scans using the new software, the frequency setting will not be carried over.

In some aspects, migration module 114 may present migration plan 308 to an administrator of the at least one computing device and/or MSP 101. Before executing the migration plan or before sending the migration plan to migration agent 114, migration module 114 may request approval of migration plan 308.

Figure 4:
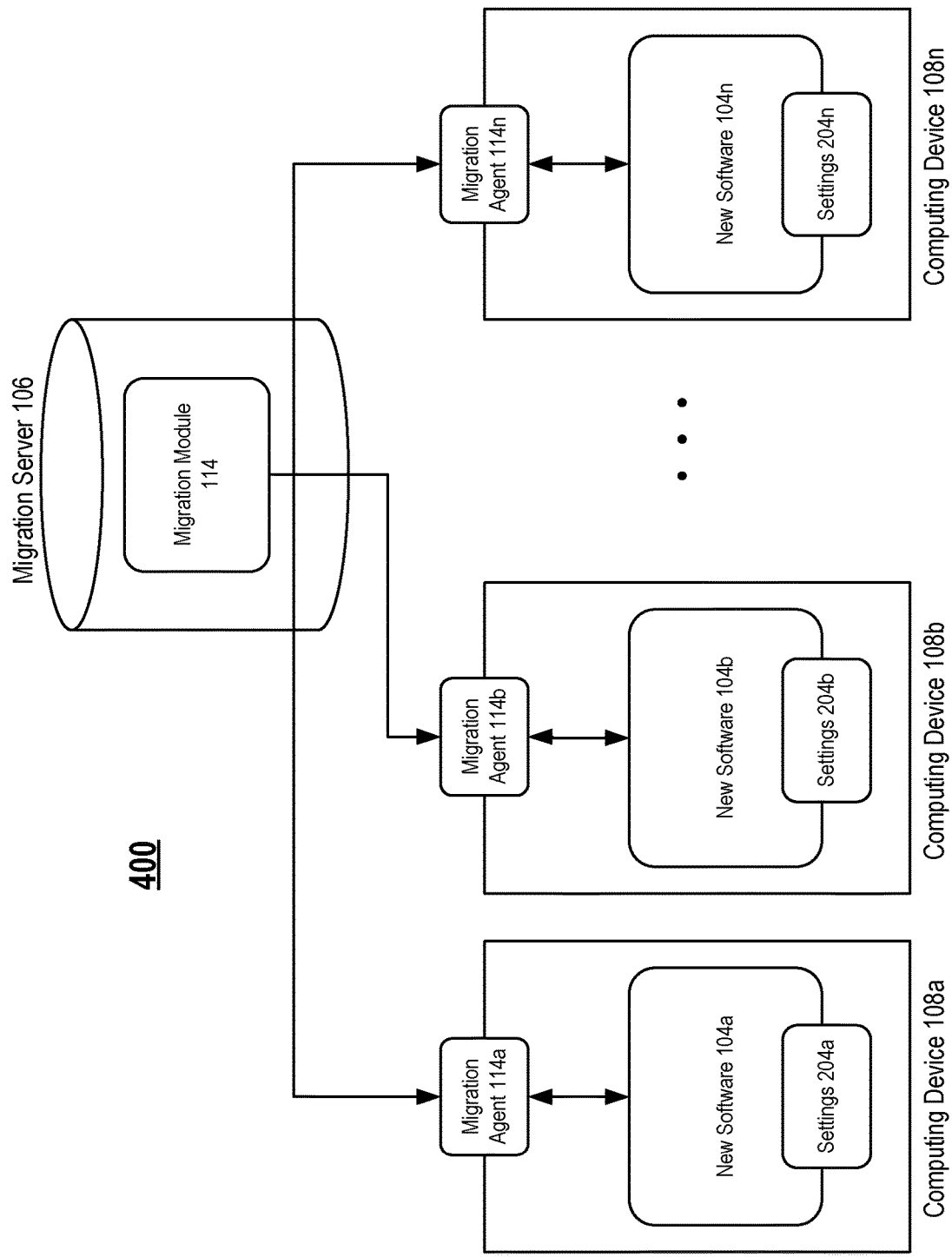
FIG. 4 is a block diagram illustrating a system for executing the migration plan, in accordance with aspects of the present disclosure.

FIG. 4 is a block diagram illustrating system 400 for executing the migration plan, in accordance with aspects of the present disclosure. In some aspects, in response to receiving an approval of the migration plan from the administrator, migration module 114 may execute the sequence of tasks indicated in migration plan 308 by installing new software 104, implementing the corresponding settings 204, and removing the existing software 110. As shown in FIG. 4, each computing device has a respective new software 104, settings 204, and no software 110.

In some aspects, migration agent 114 may receive migration plan 308 and execute it locally. The sequence of tasks may indicate when and in what order to perform the tasks of migration plan 308. Each task may represent a particular command. An example sequence is as follows:
1. find regkey[NAME]
2. parse config[-type xml|json|yaml] [-path PATH_TO_CONFIG_FILE]
3. run cmd[COMMAND]
4. start proc [PATH_TO_EXE_FILE]
5. force remove [PATH_TO_APP]
6. install New Software [CONFIG_FILE]
7. send restcmd[HOST_ADDRESS]

In some aspects, installation and removal may occur in parallel. For example migration agent 114 may identify a feature of the existing software, wherein the feature is in the plurality of features. Migration agent 114 may install files of the new software associated with the feature and apply a setting of the corresponding settings to the installed file, such that the feature is accessible on the new software. For example, the feature may involve scan for a particular virus. Because the new feature is realized on the computing device through new software 104, if the user attempts to access the feature on software 110, migration agent 114 may forward requests to access the feature received at the at least one computing device to new software 104. Subsequent to installing the new feature and applying the corresponding setting, migration agent 114 may remove files of the existing software 110 associated with the feature.

In some aspects, a MSP 101 may send a command to migrate new software 104 to the plurality of computing devices 108. Suppose that the computing device is operating using Windows OS. If a computing device is not password protected, to uninstall software 110, migration agent 114 may open Registry Editor, navigate to HKEY_LOCAL_MACHINE\SOFTWARE\Microsoft\Windows\CurrentVersion\Uninstall\, find an uninstallation key, and start uninstallation (e.g., msiexec /X {product uninstall key}).

In the case that the computing device is password protected, to uninstall software 110, migration module 114 may rely on rest API to "Get" list of all computing devices 108' hostname, create an unprotected group, put all computing devices 108 to the group, and launch uninstallation without password on each computing device. In this aspects, the REST API methods include "Get," "Put," "Post," and "Delete."

Seamless migration is applicable in any update setting because it enables users to continue to use applications and services during an update without terminating said applications and services. For example, a user may begin to use a feature of an existing software such as an anti-virus scan and complete using the feature in the new software. Suppose that a directory with a thousand files is to be scanned. Using the systems and methods of the present disclosure, the directory may be scanned using an existing anti-virus software. Midway through the scan, a new anti-virus software may be installed. The feature of scanning files for viruses may then be taken over by the new software midway and completed by the new software. Once the new software is fully installed, the existing software may be removed. Migration module 114 may determine that the feature of scanning files (i.e., the feature being currently used) requires a certain set of installation files to be executed (e.g., a communication module that communicates with a remote virus definition database, a user interface, a file parser, etc.) and installs those files immediately. Migration agent 114a may subsequently redirect all requests associated with that feature (i.e., a request to scan an object in the directory) to the new software.

In order to ensure that this installation and execution is "seamless," migration module 114 identifies at least one QoS factor to compare performance against. For example, the QoS factor may be a network bandwidth consumption of a computing device specifically allocated to migration. Suppose that the threshold QoS for network bandwidth consumption is 5 Mbps. Migration module 114 will attempt to install the new software while ensuring that the network bandwidth consumption does not exceed 5 Mbps. If the existing software is also running and is consuming bandwidth, the consumption by the existing software is also included in the QoS determination. For example, the existing software may be using 2 Mbps to upload file signatures for comparison against virus definitions. Thus, there remains 3 Mbps to download the new software installation files.

Furthermore, another QoS factor may be CPU consumption (either allocated specifically to migration services or for the computing device as a whole). For example, while the scanning feature is being used in the existing software and the new software is being downloaded and installed, CPU consumption may be 50%. If the threshold CPU consumption is 45%, migration module 114 may slow down installation or scanning to maintain CPU consumption under the threshold.

Another QoS factor may be storage usage. For example, the threshold storage usage for a computing device may be 50% of total space. If installing the new software will cause the storage usage to be 51% (i.e., will exceed the threshold), migration module 114 may identify features of the existing software that are shared with the new software. Subsequently, migration module 114 may piecewise install those features in the new software and, in parallel, remove the same features from the existing software to maintain the storage usage. In some aspects, migration module 114 may consider multiple QoS factors at once to ensure that the migration occurs with no interruptions and stable usage.

Figure 5:
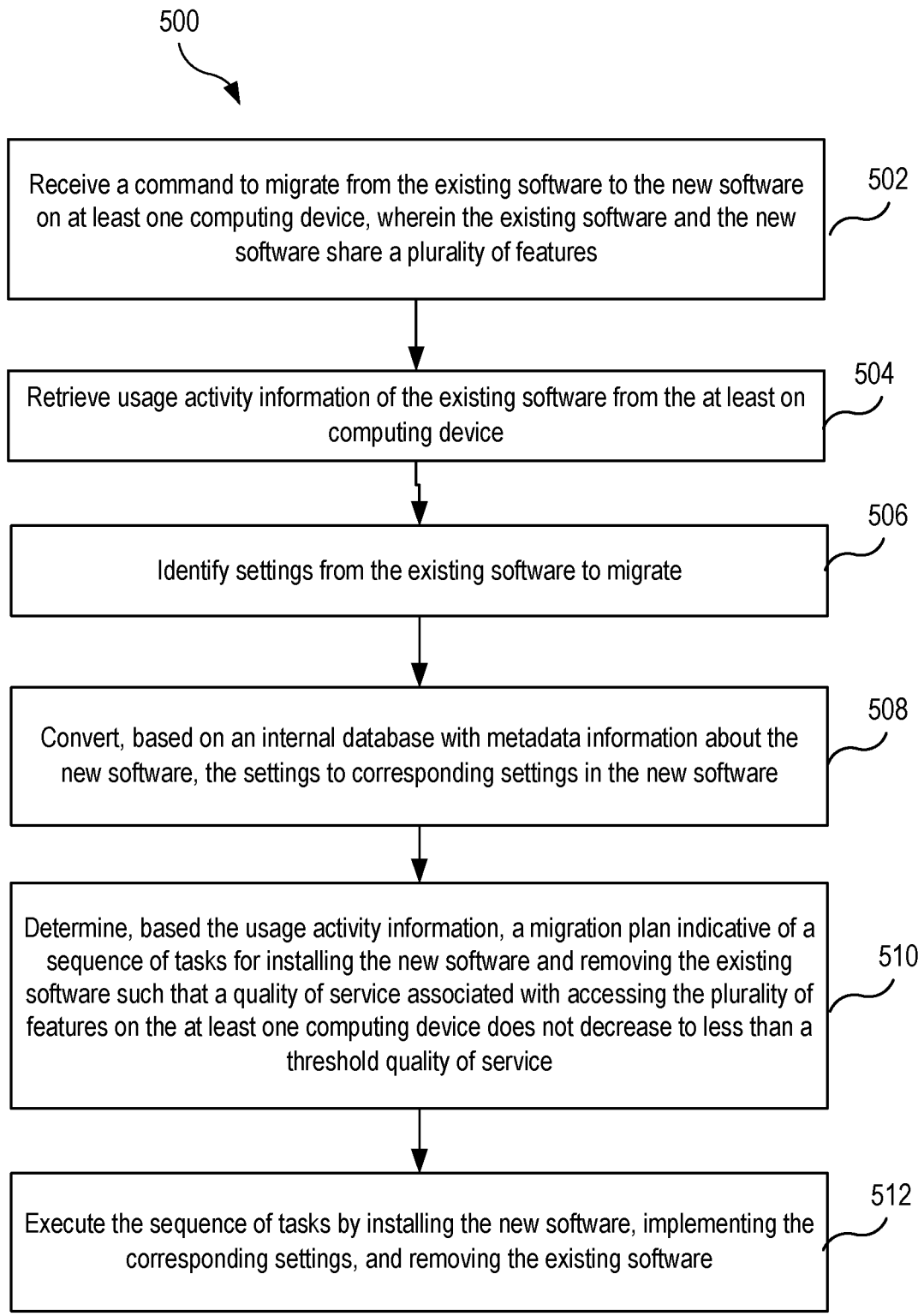
FIG. 5 illustrates a flow diagram of a method for seamlessly migrating from an existing software to a new software, in accordance with aspects of the present disclosure.

FIG. 5 illustrates a flow diagram of method 500 for seamlessly migrating from an existing software to a new software, in accordance with aspects of the present disclosure. At 502, migration module 114 receives a command (e.g., via migration agent 114a installed on computing device 108a) to migrate from an existing software (e.g., software 110a) to the new software (e.g., new software 104) on at least one computing device (e.g., computing device 108a), wherein the existing software and the new software share a plurality of features (e.g., both software are antivirus programs).

At 504, migration module 114 retrieves usage activity information (e.g., usage 302a) of the existing software from the at least on computing device. At 506, migration module 114 identifies settings (e.g., settings 112a) from the existing software to migrate. At 508, migration module 114 converts, based on an internal database with metadata information about the new software (e.g., migration database 202), the settings to corresponding settings in the new software (e.g., settings 204a).

At 510, migration module 114 determines, based the usage activity information, a migration plan (e.g., migration plan 308a) indicative of a sequence of tasks for installing the new software and removing the existing software such that a quality of service associated with accessing the plurality of features on the at least one computing device does not decrease to less than a threshold quality of service. At 512, migration module 114 executes the sequence of tasks by installing the new software, implementing the corresponding settings, and removing the existing software.

Figure 6:
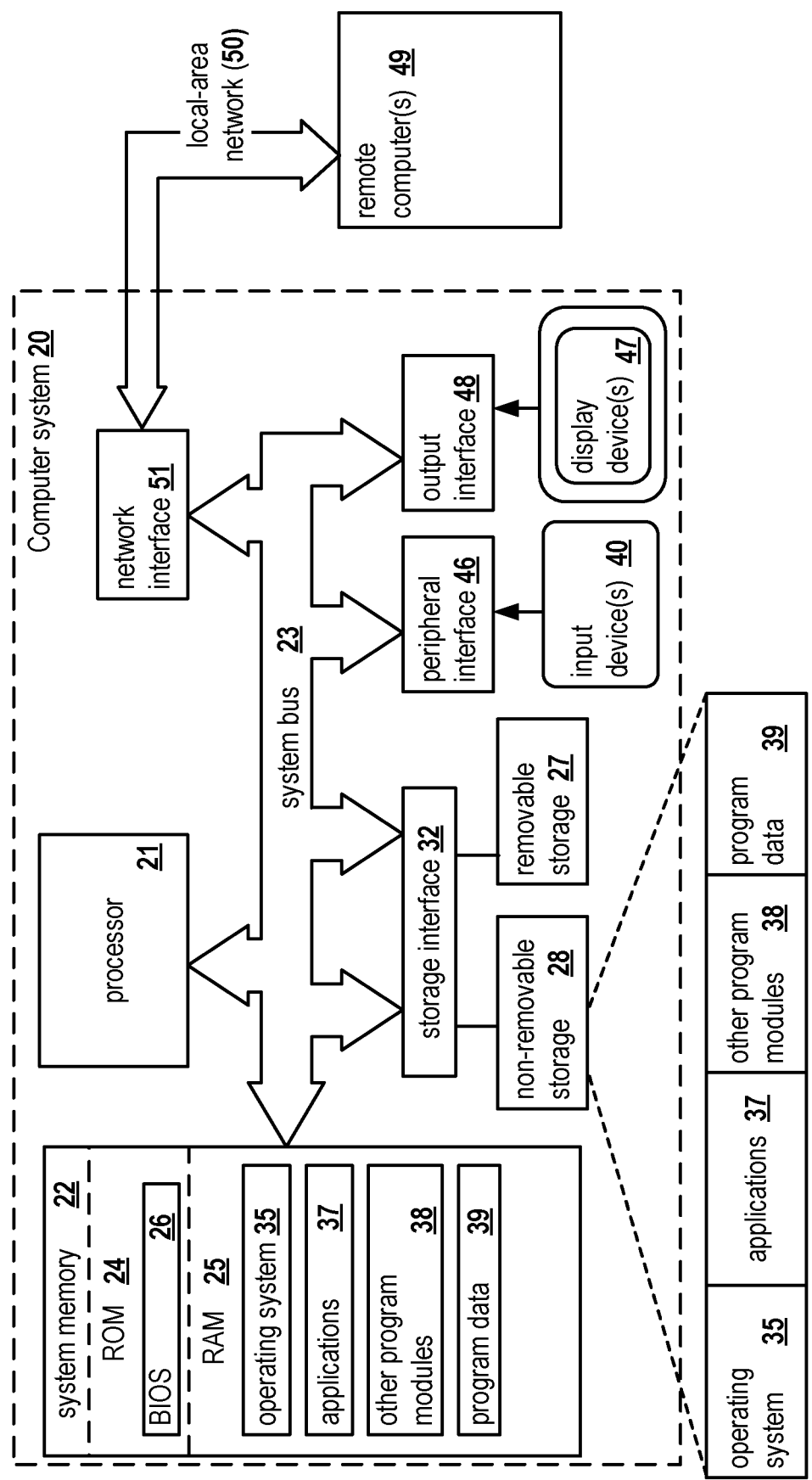
FIG. 6 presents an example of a general-purpose computer system on which aspects of the present disclosure can be implemented.

FIG. 6 is a block diagram illustrating a computer system 20 on which aspects of systems and methods for seamlessly migrating from an existing software to a new software may be implemented in accordance with an exemplary aspect. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. For example, any of commands/steps discussed in FIGS. 1-5 may be performed by processor 21. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for seamlessly migrating from an existing software to a new software, the method comprising:
   receiving a command to migrate from the existing software to the new software on at least one computing device, wherein the existing software and the new software are different applications that share a plurality of features and have different software vendors;
   responsive to receiving the command:
   retrieving usage activity information of the existing software from the at least one computing device;
   identifying settings from the existing software to migrate, by identifying at least one setting for migration in response to determining that the at least one setting has been unchanged by a user of the existing software for more than a threshold period of time;
   converting, based on an internal database with metadata information about the new software, the settings in the existing software to corresponding settings in the new software;
   determining, based on the usage activity information, a migration plan indicative of a sequence of tasks for installing the new software and removing the existing software such that a quality of service associated with accessing the plurality of features on the at least one computing device does not decrease to less than a threshold quality of service; and
   executing the sequence of tasks while the existing software is running, wherein executing the sequence of tasks comprises:
   detecting that a respective feature is being executed on the existing software
   installing files of the new software associated with the respective feature;
   applying a setting of the corresponding settings to the installed files, such that the respective feature is accessible on the new software;
   while the respective feature is being executed on the existing software on the at least one computing device, forwarding, to the new software on the at least one computing device, new requests to execute the respective feature, wherein the user begins access of the respective feature on the existing software and completes the access of the respective feature on the new software during migration on the at least one computing device; and
   removing files of the existing software associated with the feature.

2. The method of claim 1, further comprising: presenting the migration plan to an administrator of the at least one computing device, wherein executing the sequence of tasks is in response to receiving an approval of the migration plan from the administrator.

3. The method of claim 1, wherein the existing software and the new software are anti-virus software, wherein identifying the settings from the existing software to migrate further comprises: identifying at least one of: (1) an anti-virus scanning schedule, (2) actions to perform for each type of virus and malware, (3) exception directories that do not need to be scanned, (4) authorized users.

4. The method of claim 1, wherein determining the migration plan further comprises: ranking each respective feature in the plurality of features based on a likelihood of the respective feature being accessed during migration; scheduling tasks of the sequence of tasks in accordance with the ranking, wherein features with higher likelihoods are scheduled for installation before features with lower likelihoods.

5. The method of claim 1, wherein determining the migration plan further comprises: ranking each respective feature in the plurality of features based on a likelihood of the respective feature being accessed during migration; scheduling tasks of the sequence of tasks in accordance with the ranking, wherein features with lower likelihoods are scheduled for installation before features with higher likelihoods.

6. The method of claim 1, wherein identifying the settings of the existing software, further comprises identifying at least one setting manually adjusted by the user of the existing software of the at least one computing device.

7. The method of claim 1, wherein identifying the settings of the existing software further comprises not selecting at least one setting for migration in response to determining that the at least one setting does not optimize the quality of service when accessing at least one feature of the plurality of features on the new software.

8. The method of claim 1, wherein the existing software and the new software are anti-virus software, and wherein the quality of service is measured based on any combination of:(1) a time required to perform a scan of the at least one computing device, (2) an amount of objects scanned on the at least one computing device, (3) a number of malicious objects found, (4) an amount of directories that are infected despite an active firewall, and (5) an amount of time to download new virus definitions.

9. A system for seamlessly migrating from an existing software to a new software, the system comprising:
   a hardware processor configured to:
   receive a command to migrate from the existing software to the new software on at least one computing device, wherein the existing software and the new software are different applications that share a plurality of features and have different software vendors;
   responsive to receiving the command:
   retrieve usage activity information of the existing software from the at least one computing device;
   identify settings from the existing software to migrate, by identifying at least one setting for migration in response to determining that the at least one setting has been unchanged by a user of the existing software for more than a threshold period of time;
   convert, based on an internal database with metadata information about the new software, the settings in the existing software to corresponding settings in the new software;
   determine, based on the usage activity information, a migration plan indicative of a sequence of tasks for installing the new software and removing the existing software such that a quality of service associated with accessing the plurality of features on the at least one computing device does not decrease to less than a threshold quality of service; and executing the sequence of tasks while the existing software is running, wherein executing the sequence of tasks comprises:
  detecting that a respective feature is being executed on the existing software;
  installing files of the new software associated with the respective feature;
  applying a setting of the corresponding settings to the installed files, such that the respective feature is accessible on the new software;
  while the respective feature is being executed on the existing software on the at least one computing device, forwarding, to the new software on the at least one computing device, new requests to execute the respective feature, wherein the user begins access of the respective feature on the existing software and completes the access of the respective feature on the new software during migration on the at least one computing device; and
  removing files of the existing software associated with the feature.

10. The system of claim 9, wherein the hardware processor is further configured to: present the migration plan to an administrator of the at least one computing device, wherein executing the sequence of tasks is in response to receiving an approval of the migration plan from the administrator.

11. The system of claim 9, wherein the existing software and the new software are anti-virus software, wherein the hardware processor is configured to identify the settings from the existing software to migrate by: identifying at least one of: (1) an anti-virus scanning schedule, (2) actions to perform for each type of virus and malware, (3) exception directories that do not need to be scanned, (4) authorized users.

12. The system of claim 9, wherein the hardware processor is configured to determine the migration plan by: ranking each respective feature in the plurality of features based on a likelihood of the respective feature being accessed during migration; scheduling tasks of the sequence of tasks in accordance with the ranking, wherein features with higher likelihoods are scheduled for installation before features with lower likelihoods.

13. The system of claim 9, wherein the hardware processor is configured to determine the migration plan by: ranking each respective feature in the plurality of features based on a likelihood of the respective feature being accessed during migration; scheduling tasks of the sequence of tasks in accordance with the ranking, wherein features with lower likelihoods are scheduled for installation before features with higher likelihoods.

14. The system of claim 9, wherein the hardware processor is configured to identify the settings of the existing software by identifying at least one setting manually adjusted by the user of the existing software of the at least one computing device.

15. The system of claim 9, wherein the hardware processor is configured to identify the settings of the existing software by not selecting at least one setting for migration in response to determining that the at least one setting does not optimize the quality of service when accessing at least one feature of the plurality of features on the new software.

16. A non-transitory computer readable medium storing thereon computer executable instructions for seamlessly migrating from an existing software to a new software, including instructions for:
  receiving a command to migrate from the existing software to the new software on at least one computing device, wherein the existing software and the new software are different applications that share a plurality of features and have different software vendors; responsive to receiving the command:
  retrieving usage activity information of the existing software from the at least one computing device;
  identifying settings from the existing software to migrate, by identifying at least one setting for migration in response to determining that the at least one setting has been unchanged by a user of the existing software for more than a threshold period of time;
  converting, based on an internal database with metadata information about the new software, the settings in the existing software to corresponding settings in the new software;
  determining, based on the usage activity information, a migration plan indicative of a sequence of tasks for installing the new software and removing the existing software such that a quality of service associated with accessing the plurality of features on the at least one computing device does not decrease to less than a threshold quality of service; and
  executing the sequence of tasks while the existing software is running, wherein executing the sequence of tasks comprises:
  detecting that a respective feature is being executed on the existing software;
  installing files of the new software associated with the respective feature;
  applying a setting of the corresponding settings to the installed files, such that the respective feature is accessible on the new software;
  while the respective feature is being executed on the existing software on the at least one computing device, forwarding, to the new software on the at least one computing device, new requests to execute the respective feature, wherein the user begins access of the respective feature on the existing software and completes the access of the respective feature on the new software during migration on the at least one computing device;
  and removing files of the existing software associated with the feature.

* * * * *